Feb. 7, 1950 W. L. BUMBER 2,496,439
RECEPTACLE CLOSURE
Filed Dec. 18, 1944
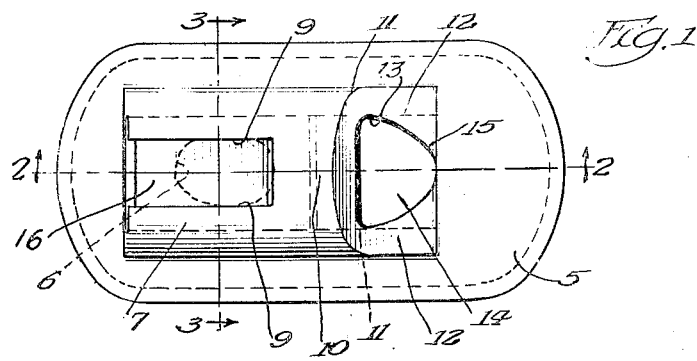
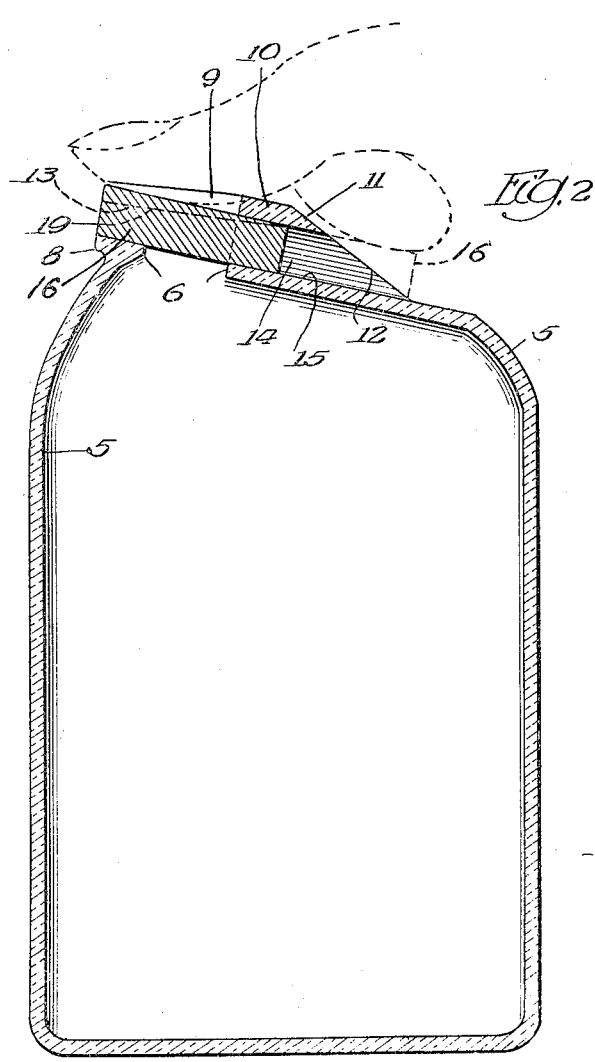
Inventor
Walter L Bumber
By Kurt W. Wonnell
atty.

Patented Feb. 7, 1950

2,496,439

UNITED STATES PATENT OFFICE 2,496,439

RECEPTACLE CLOSURE

Walter L. Bumber, Chicago, Ill.

Application December 18, 1944, Serial No. 568,595

6 Claims. (Cl. 215—37)

This invention relates to a closure for a receptacle and is more particularly described as a bottle stopper, although it may have a more general application wherever it can be used.

An important object of the invention is to provide a stopper for a bottle and other receptacles which may be pushed in opposite directions for opening and closing the receptacle, and which is not liable to be pushed into the receptacle.

A further object of the invention is to provide a stopper movable in opposite directions which is frictionally retained in position when the closure is entirely open so that the stopper will not become lost.

A still further object of the invention is to make a stopper movable in opposite directions for opening and closing a receptacle which is moved wedgingly in the closing position.

A still further object of the invention is to provide a stopper mounted for transverse movement at the end of a receptacle in a spout which has a transverse bridge for holding the stopper free and clear of the discharge opening to facilitate the filling and emptying of the receptacle.

Other objects of the invention will appear in the specification and will be apparent from the accompanying drawings in which Fig. 1 is a top view of a receptacle having a closure constructed in accordance with the principles of this invention;

Fig. 2 is a sectional view taken on the line 2—2 of Fig. 1;

Fig. 3 is a transverse section taken on the line 3—3 of Fig. 1; and

Fig. 4 is a perspective of the stopper shown in Fig. 1.

This invention comprises a stopper which is preferably made of any pliant material such as cork, rubber, rubber substitutes and the like, in which the stopper is mounted for movement in opposite directions in a holder extending transversely of the receptacle opening and providing a spout and a holder for the stopper which is retained on the container at all times.

Referring more particularly to the drawings, a container 5 may be of any desired size or shape having a fill and discharge opening preferably at the end thereof across which extends an open ended pouring spout 7 preferably formed of the same material as that of the container itself.

The pouring spout extends beyond the fill opening at both ends and is preferably inclined to the normal horizontal position of the receptacle as shown more clearly in Fig. 2, although it may be at more or less of an inclination if desired. The front under end of the spout is formed with a chin 8 which adapts it to rest upon the rim of a glass or any other container when the contents of the receptacle is emptied therefrom.

At the top of the spot and extending from the outer end thereof is a slot 9 which extends entirely across the fill opening 6 so that there is no obstruction of the fill opening either for emptying or filling the receptacle.

At the rear end of the pouring spout is a transverse bridge 10 extending from the rear end of the slot 9 and the opposite end 11 of the bridge and the sides 12 of the spout being beveled down to the upper surface of the container.

The inner and under edges 13 of the sides of the slot 9 are each tapered downwardly from a point intermediate the ends of the bridge to the outer end thereof to provide a wedging surface for engaging the stopper, the intermediate portion of the stopper passage 14 being of uniform thickness throughout and below the bridge 10, and the inner or lower edge 15 being preferably rounded throughout as indicated more clearly in Fig. 3.

A stopper 16 is provided to fit the stopper opening which is composed of rubber, cork, or any suitable and more or less pliant material adapted to make a sealing engagement for bottles and other containers. This stopper has a rounded bottom 17 to fit the bottom 15 of the pouring spout and a flat top 18 parallel to the bottom and therefore of uniform thickness throughout its length. Side shoulders 19 are tapered from one end of the stopper to the other at the same inclination as that of the tapered sides 13 of the support. This stopper is of a proper size and usually slightly oversized to fit tightly in the pouring spout and under the bridge 10 which has a flat under surface corresponding to that of the top surface 18 of the stopper.

The stopper may thus be moved in the pouring spout to cover and uncover the discharge opening 6, and the stopper is retained in connection with the receptacle at all times by the engagement of the under side of the bridge with the top surface 18 of the stopper. The stopper may be pressed in either direction by engagement of the thumb or fingers therewith, the thumb or fingers being pressed into the slot 9 in engagement with the top surface 18 of the stopper for that purpose and when the stopper is pressed forwardly, the tapering sides of the spout and the tapering side of the stopper are wedgingly engaged to make a tight application of the stopper over the discharge opening 6.

In the opening the closure, the outer end of the stopper is pressed rearwardly until the thumb or finger engages the bridge 10 and even with the discharge opening entirely uncovered, the under surface of the bridge will engage the top surface 18 of the stopper and hold it tightly in place with the rear end projecting from the rear or bevel portion of the spout so that the stopper is easily pressed forward into closing position.

Although the pouring spout is shown curved at the bottom, it may also be of other shapes. By having the opening entirely uncovered by the stopper, there is no obstruction in filling or emptying the receptacle, and straws or a hose may be readily inserted through the opening. The stopper may also be partially closed over the discharge opening to restrict the flow of liquid therefrom and although shown as centered with respect to the receptacle, the discharge opening may be at any desired location with respect to the receptacle.

For ordinary liquids and other substances, the wedging sides of the spout and stopper may not be necessary, but to retain some liquids or fluids under pressure, the tapering sides and wedging engagement may be desirable.

Although a stopper of cork, rubber, and the like is specified, a stopper of glass, plastic, or any other suitable material may also be used.

With this construction, a particularly fluid tight connection may be provided which is easily moved in opposite directions to open or close the receptacle without requiring special tools or implements to move the stopper, and regardless of the position of the stopper, it is always retained in connection with the receptacle so that it does not become lost or displaced.

Other constructions, combinations and arrangements of the parts may be embodied without departing from the spirit and scope of the invention.

I claim:

1. The combination with a receptacle having a top including an opening with an open ended pouring spout with a rounded bottom extending transversely of the receptacle over the opening, the spout having a slot in the top extending from one end across the opening and having a bridge at the end of the slot at the other side of the opening, and a stopper having a flat top and a rounded bottom slidable in the spout below the bridge and held in place by the bridge, the stopper being manually engageable through the slot.

2. A receptacle having a top including an opening with a transverse pouring spout with a rounded bottom and open at both ends, and having a slot in the top extending from one end over the opening with a bridge at the other side of the opening, and a stopper having a flat top with a rounded bottom and fitting in the spout slidable entirely below and retained in place by the bridge, the stopper being manually engageable and movable through the slot.

3. A receptacle having a top including an opening with a transverse pouring spout with a rounded bottom open at both ends with a slot in the top extending from one end over the pouring opening, the sides of the slot tapering inwardly toward the end of the spout, a bridge extending over the spout at the end of the slot, and a stopper having a flat top and a rounded bottom fitting slidably in the spout with a portion of uniform thickness to engage the bridge and with side edges tapering to wedgingly engage the tapered sides of the slot.

4. A closable receptacle having a fill and discharge opening with a transverse pouring spout with a rounded bottom open at both ends and having a slot at the outer side extending from one end over the opening and terminating in a transverse bridge, the bridge and pouring spout at the adjacent end being beveled to uncover the end of the spout, and a stopper having a flat top and a rounded bottom fitting slidably in the spout and of a length to engage the bridge and cover the opening and to engage the bridge and project into the beveled end of the spout, the stopper being manually engageable at the beveled end of the spout.

5. A receptacle having a fill and discharge opening at the upper end with a pouring spout having a rounded bottom and open at both ends and extending transversely from said opening, the spout having a slot in its outer side at one end with the edges of the slot tapered downwardly toward that end and a transverse bridge extending over the spout at the end of the slot, and a stopper with a flat top and a rounded bottom fitting slidably in the spout and having a portion of uniform size to engage the under side of the bridge at all times and having tapered edge portions to engage the tapered side edges of the slot wedging the stopper in closing position over the opening.

6. A receptacle having a top including a fill and discharge opening with a transverse pouring spout extending transversely and at opposite sides of the opening, the bottom of the spout being rounded and the sides of the spout having undercut edges, a bridge extending transversely across the spout at one side of the opening, the end of the spout at one side of the bridge being beveled downwardly toward the bottom of the spout, and a stopper having a bottom rounded portion fitting slidably in the spout with shouldered side edges to engage the undercut edges of the spout, and having a flat top to slidably engage the underside of the bridge and movable thereunder from one end to the other in contact with the under side of the bridge.

WALTER L. BUMBER.

REFERENCES CITED

The following references are of record in the file of this patent:

UNITED STATES PATENTS

| Number | Name | Date |
|---|---|---|
| 1,464,395 | Ross | Aug. 7, 1923 |
| 2,099,289 | Anderson | Nov. 16, 1937 |
| 2,159,978 | Parkin | May 30, 1939 |
| 2,202,653 | Glidden | May 28, 1940 |

FOREIGN PATENTS

| Number | Country | Date |
|---|---|---|
| 398 | Great Britain | Jan. 30, 1877 |
| 133,649 | Great Britain | Oct. 16, 1919 |
| 507,498 | France | June 24, 1920 |